Feb. 13, 1940.  J. E. PADGETT  2,190,041
BEARING
Filed Feb. 19, 1937  2 Sheets-Sheet 1
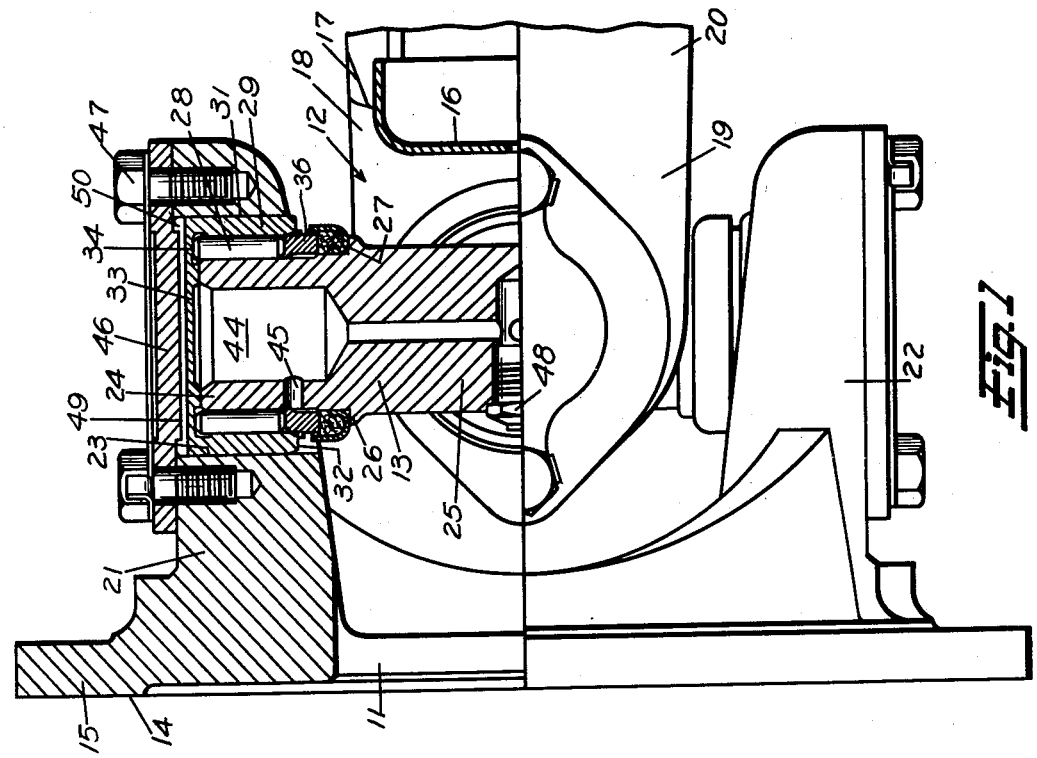
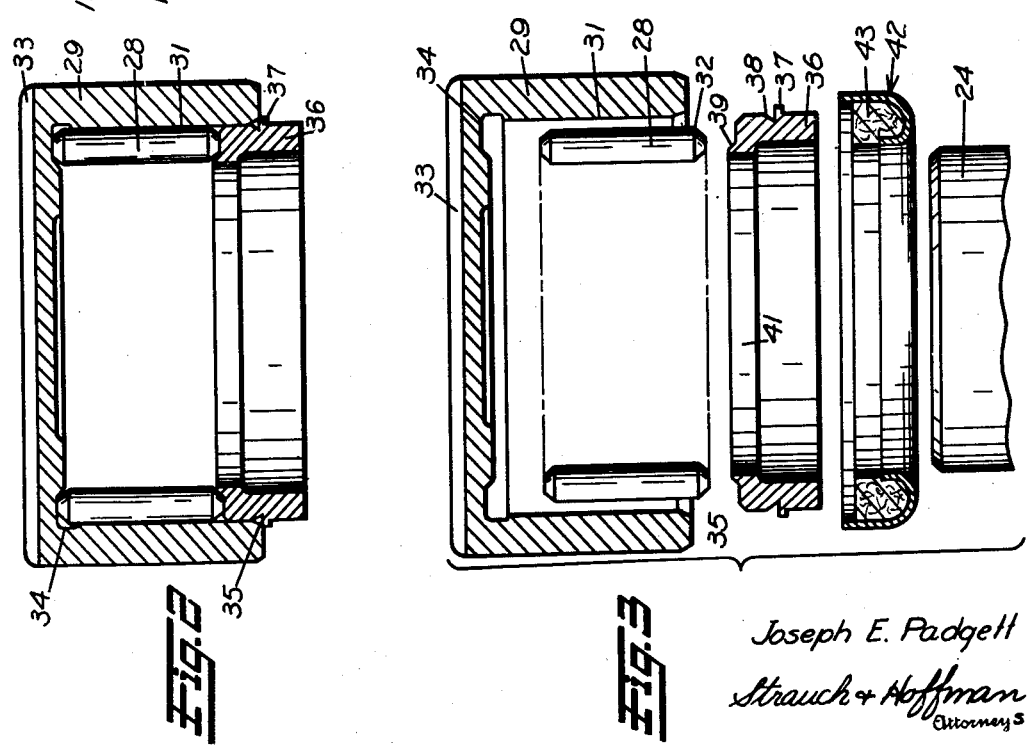
Joseph E. Padgett
Strauch & Hoffman
Attorneys Feb. 13, 1940. J. E. PADGETT 2,190,041
BEARING
Filed Feb. 19, 1937 2 Sheets-Sheet 2
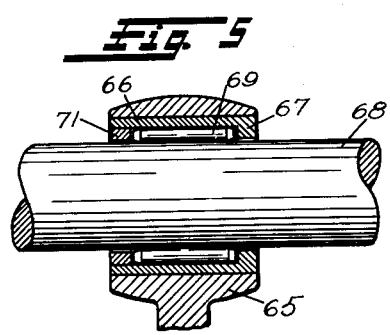
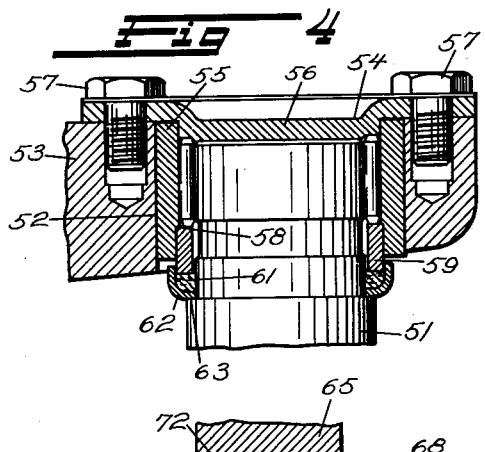
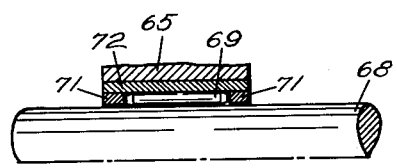
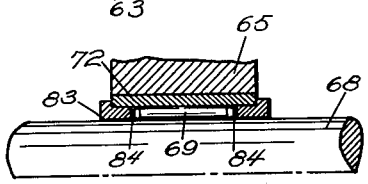
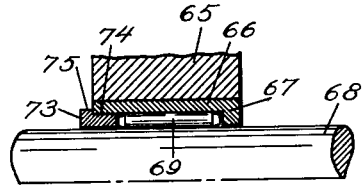
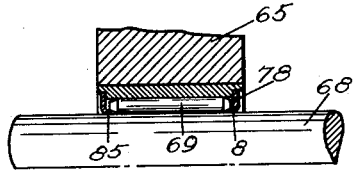
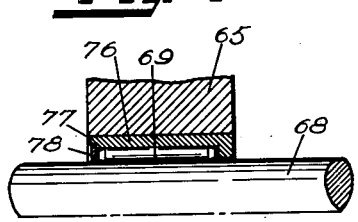
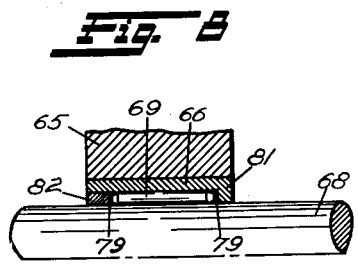
Inventor
Joseph E. Padgett
By Strauch & Hoffman
Attorneys Patented Feb. 13, 1940

2,190,041

UNITED STATES PATENT OFFICE 2,190,041

BEARING

Joseph E. Padgett, Toledo, Ohio

Application February 19, 1937, Serial No. 126,714

16 Claims. (Cl. 64—17)

This invention relates to novel bearing assemblies, and more particularly to needle bearing assemblies of the types employed in universal joints, connecting rods, shafts, and the like.

In needle bearing assemblies of the type disclosed in my Patent No. 2,032,497, issued March 3, 1936, the needles are arranged in the form of an annulus or sliding and rolling sleeve of needles and lubricant about a trunnion and then surrounded by a bearing race in the shape of a cup, the closed end thereof serving as a seal for the outer end of the bearing. A lubricant seal comprising a relatively thin sheet metal cap is mounted on the trunnion and fitted over the open end of the cup-shaped bearing race.

Since sufficient clearance between the race and the needles is essential to the proper functioning of the needle and lubricant sleeve while too great clearance causes undesirable lost motion in the joint, it is desirable to manufacture the bearing assemblies with a minimum operating clearance.

While providing an excellent seal, the construction shown in Patent 2,032,497 has proven to be the cause of failure of the bearing assemblies in a number of instances since the metal cap, when tight enough to hold properly, tends to distort the open end of the cup-shaped bearing race, reduce the clearance between the race and the needles, and cause binding of the needles.

In overcoming this disadvantage of the prior art, it is a major object of my invention to provide a novel bearing assembly including a bearing race wherein the race cannot be distorted to reduce the clearance between the race and needles and cause binding of the needles.

A further object of the present invention resides in providing a novel needle bearing assembly wherein a race is provided with a needle retainer designed to fit within the end or ends of the race, depending upon the type of race employed, and prevent distortion effecting a reduction in clearance with respect to the contacting annulus of needles.

Still a further object of my invention resides in the provision of a novel needle bearing assembly wherein the race is maintained in predetermined relation with respect to both the lateral and longitudinal displacement of the contained annulus of needles, and there is no distortion of the race tending to bind the needles and cause failure of the joint.

A further object of my invention is to provide a novel bearing assembly including a race, bearing retainer and lubricant seal wherein a satisfactory lubricant seal is obtained and proper clearances for operation of the bearing are maintained despite the elastic deformation of the surrounding structures under heavy load.

It is still a further object of my invention to provide a needle bearing assembly of novel construction, enabling the entire assembly to be handled as a unit when being applied to or removed from a trunnion or like member.

A further object of my invention is to provide a novel bearing assembly wherein the bearing surfaces can be conveniently and accurately machined and ground, the assembly also being characterized by its ease of assembly and the positioning of the parts in their proper positions.

Other objects and advantages of the present invention will appear from the following description and from the appended claims read in connection with the attached drawings in which:

Figure 1 is a side elevation of a universal joint embodying my invention, taken partly in section to illustrate the novel bearing construction.

Figure 2 is an enlarged section of a detail of the bearing assembly of Figure 1.

Figure 3 is an exploded view in section of the bearing assembly of Figure 1 showing the elements in the order of their assembly.

Figure 4 is a side elevation of a further preferred embodiment of my invention in a universal joint.

Figure 5 is a section through a portion of a connecting rod illustrating a preferred manner of applying my invention to a bearing assembly not subject to centrifugal force on a line through the axis of the bearing as is the case in a universal joint.

Figures 6 to 11, inclusive, are sections of bearing assemblies generally similar to the assembly of Figure 5 and representing preferred modifications of my invention.

Referring to Figure 1 of the drawings, the universal joint there shown comprises in its simplest form yokes 11 and 12 and a spider or cross 13. For the purpose of illustrating this application of the present invention, a joint of the type employed in connection with a drive shaft of a motor vehicle is shown. However, it is to be understood that the invention is not to be limited to that specific type of joint nor to the specific application of the novel bearing assembly to such a joint and other applications of the bearing of the present invention will be described.

Yoke 11 is preferably finished with a flat face 14 formed with a flange 15 to enable connection to a suitable driving or driven element, not forming a part of this invention, further description thereof being omitted. The driving connection may be secured to bolts or other fastening means passed through suitable holes formed in flange 15.

Yoke 12 has provided thereon a portion 16 welded or otherwise suitably fastened for driving engagement with a tubular member 17, not forming a part of this invention and therefore not further described.

Yoke 12 has formed therewith, preferably in integral manner, two spaced arms 18 and 19 which extend from the body 20 of the yoke, the ends of arms 18 and 19 terminating at a point where they are spaced some distance apart.

Yoke 11 is similarly provided with a pair of spaced arms 21 and 22. At the end of each spaced arm, an aperture is provided, such as aperture 23 in arm 21, the apertures in the spaced arms of each yoke being disposed in axial alignment with one another.

To connect the spaced yoke arms in relatively movable relation, spider 13 is provided. Spider 13 is preferably of cross shape and has four trunnions formed thereon such as trunnion 24, the trunnions being arranged at ninety degree intervals around a main body portion 25. The surface of each trunnion 24 is hardened and ground for a purpose to be later described. Trunnions 24 are separated from the main body portion 25 of the spider by a shoulder 26, which serves as a support for a lubricant seal as hereinafter described.

The aligned apertures in the spaced yoke arms are provided with bearing assemblies within which the corresponding aligned trunnions are arranged to oscillate. Since all of the apertures together with their associated bearing assemblies and trunnions are identical, the description will be confined to a single aperture 23 and its associated bearing and trunnion as shown in detail in Figures 1, 2 and 3.

Aperture 23 is of such size that trunnion 24 can be inserted therein by tilting the spider with relation to the yokes, and when inserted or accommodated therein defines an annular space therearound. Within this space, and disposed adjacent to and in an annular relation to trunnion 24 is an annulus or sleeve of individual bearing needles or elements 28. Elements 28 are cylindrical in shape with polished surfaces, each end thereof being formed as a truncated cone.

The needle annulus or sleeve is surrounded by a cup-shaped member or race 29, which is formed with a hardened and ground inner surface 31 which contacts with the sides of needles 28 and serves as an outer race therefor. The inner end of race 29 is open as shown at 32 and the outer end thereof is closed to form a sealing cap as shown at 33. Cap 33 is preferably formed integral with race 29, not only to economize on manufacturing costs, but to provide a more perfect lubricant seal for the bearing. Cap 33 is formed with an annular recess 34 to receive the upper ends of needles 28.

Race 29 is preferably formed adjacent its lower end with a slightly chamfered portion 35 to facilitate the reception of a needle retainer 36 which is of a size to fit snugly within the open end of race 29 and engage the same in lubricant-sealing relation. It will be noted in Figure 3 that needle retainer 36 is of annular shape and has a shoulder or flange 37 designed to engage the lower face of the race 29. An undercut 38 is formed adjacent shoulder 37 to eliminate the formation of a fillet which would upset the contact between flange 37 and the end of race 29 and thereby position retainer 36 inaccurately. Needle retainer 36 has its upper face beveled as shown at 39 so that in assembled relation a groove is formed which with groove 34 maintains the needles loosely in position.

Flange 37 is so positioned that when retainer 36 is placed in race 29 in its innermost position, retainer 36 will be in its correct position with regard to the clearances that are necessary for proper operation of the annulus of needles. The longitudinal clearance will be maintained by reason of the engagement of flange 37 and the bottom of race 29, and distortion and any possible contraction of race 29 affecting radial clearance will be prevented by reason of the presence of needle retainer 36 in the open end of race 29. Needle retainer 36 is formed with a portion 41 of reduced diameter which is designed to be positioned about trunnion 24. Portion 41 is of sufficient diameter to establish a definite clearance with the trunnion.

To retain the lubricant and exclude dirt and water, a lubricant seal 42 is provided on shoulder 27 of trunnion 24. Seal 42 is in the form of a metal shell forming a channel and containing a suitable packing material 43 against which the lower face of needle retainer 36 presses when the bearing is assembled. The outer edge of seal 42 is of a diameter to surround and of a size to extend outwardly beyond the inner edge of the needle retainer to prevent the entry of any foreign matter to the bearing assembly by reason of centrifugal force when the universal joint is operated and the inner diameter of seal 42 is such that it is a press fit on trunnion 24 when assembled.

A lubricant reservoir 44 is formed within trunnion 24, a connection from the reservoir extending into the main body portion 27 of spider 13. A passage 45 leads from lubricant reservoir 44 to a point on the outer surface of trunnion 24 adjacent the needle retainer 36 and discharges lubricant thereto. Further lubrication of the bearing assembly is obtained by reason of the open top of reservoir 44 from which lubricant passes to needles 28, the inner surface of cap 33 being recessed to aid in the distribution of lubricant.

Lubricant is supplied to the several reservoirs 44 through a conventional fitting shown at 48 preferably located at the center of the spider 13 whereby there is no tendency for centrifugal force to drive lubricant outwardly through the fitting.

When assembled as shown in Figure 1, bearing race 29 is held in position by a retaining plate 46, held in place on yoke arm 21 by suitable bolts 47 or similar fastening means. Retainer plate 46 is preferably formed with a projecting lug 49 which engages a complementary groove 50 formed in the top of race cap 33 to prevent rotation of the race 29.

Referring to Figure 2, it will be noted that the race may be assembled with the annulus of needles therein and the needle retainer forced into the open end of the race until the inner end of race 29 and shoulder 37 of retainer 36 are together. By reason of the grooves defined by the upper face of needle retainer 36 and the under side of cap 33 on race 29, the needles 28 are held in proper position. The ability to handle the entire assembly shown in Figure 2 as a unit facilitates assembly and repair of a universal joint inasmuch as it is not necessary to assemble the elements piece by piece upon the several trunnions. In this connection it is to be noted that the beveled surface 39 of needle retainer 36 has sufficient clearance with reference to the groove 34 so that the annulus of needles may properly contact the bearing face of trunnion 24 when the bearing is assembled.

Referring to Figure 4, I have there shown a further preferred embodiment of my invention in a universal joint. For convenience in illustration only a portion of the joint is shown, reference being made to Figure 1 for the complete assembly.

In Figure 4, a trunnion 51 is shown arranged to fit within an aperture 52 in yoke arm 53. The trunnion surface adjacent the end of trunnion 51 is hardened and ground and is surrounded by an annulus 54 of needle bearings. A race 55 in the form of a collar is provided to support bearing annulus 54, the race being closed at its outer end by a cap 56, secured to yoke arm 53 by suitable fastening means 57. As will be noted the upper end of race 55 engages a shoulder on cap 56 so that the cap is always in a predetermined position with reference to the race and bearing annulus.

At its lower end, race 55 is formed with a shoulder 58 to receive a needle retainer 59, also in the form of a collar. Retainer 59 is dimensioned to make a press fit within race 55, the position of the retainer being determined by shoulder 58. The lower end of the retainer, when assembled, engages suitable packing 61 in a retainer 62, the latter resting on a shoulder 63 formed on trunnion 51. Packing 61 serves to prevent the escape of lubricant and the entrance of dirt and water. While no system of lubrication is described, it is to be understood that any suitable means such as that shown in Figure 1 may be employed.

In Figures 5 to 11, inclusive, I have illustrated further applications of my invention to other types of assemblies. The assemblies shown in Figures 5 to 11, inclusive, differ principally from those previously described in that in operation there is no centrifugal action parallel to the axis of the bearing annulus.

Referring to Figure 5, I have there shown my invention as embodied in a connection between a connecting rod and a piston pin of a reciprocating engine. This assembly generally resembles that shown in Patent No. 1,717,204 to Götz for Needle bearings. In a connection such as shown in the Götz patent, considerable difficulty is encountered in manufacture because of the fact that the collar-shaped race has an internally extending flange on each end. Thus when grinding the race, the grinding wheel must be moved to one side after passing the flanges at the ends and is very difficult to position accurately. The two corners that are defined by the flanges and the race are exceedingly difficult to grind, and finally there is extreme difficulty in making accurate measurements of the race.

In Figure 5, a connecting rod 65 is shown with a bearing race 66 fitted therein, a flange 67 being formed integral therewith at one end of an internal diameter to clear a piston pin 68. A bearing annulus 69 formed of needle bearings is provided to support crank pin 68 on race 66, the bearing annulus being held in position with the proper clearance by a needle retainer 71.

Retainer 71 is in the form of a collar and is so dimensioned that it can be press-fitted into the open end of race 66, the correct positioning of retainer 71 being secured by making the retainer of a length so that when it is fitted into the end of race 66, and the end of the race is flush with the end of the retainer, the retainer will be in its correct position with regard to flange 67.

By making needle retainer 71 removable, access may be readily had to the interior of race 66 with a grinding wheel and the surface ground with little difficulty.

In Figure 6, I have shown a further embodiment of my invention wherein the ease of machining and grinding the race is even greater than in the embodiment shown in Figure 5. In this embodiment wherein like reference characters are employed to designate like parts, race 72 differs from race 66 in that the former is formed as a hollow cylinder with no flanges on the ends thereof. In lieu of flange 67 of Figure 5, a second needle retainer 71 is provided, both retainers 71 being sized to be press-fitted within the ends of race 72 and of lengths such that when the outer ends of the retainers are flush with the outer ends of the race, the retainers will be in their correct position as regards the clearance for the bearing annulus.

In the modification shown in Figure 7, a needle retainer 73 having two sections 74 and 75 of different external diameters is employed. The smallest section 74 is of a size to be press-fitted within the open end of race 66, the shoulder, formed by sections 74 and 75, determining the position of retainer 73, i. e., when the shoulder is in contact with the end of the race, the retainer is in its correct position.

In Figure 8, I have shown a modification employing a retainer of sheet metal or the like that may be cheaply manufactured as by stamping. In this modification of my invention, the race 76 is cut away at one or both of its ends to form a flange 77. A needle retainer 78 formed of sheet metal or the like as by stamping is fitted within flange 77 and against the end of the race. Flange 77 is cut to a predetermined depth so that when retainer 78 is in place, it will be properly positioned with reference to the bearing annulus.

Figure 9 illustrates a modification of the assembly of Figure 5, the modification residing in the provision of an inturned lip 79 on the integral flange 81 and an inturned lip on the inner face of needle retainer 82.

Figures 10 and 11 represent similar modifications of the assemblies shown in Figures 7 and 8, respectively. In Figure 10, needle retainers 83 are shown of the same general shape as retainer 73 of Figure 7 except that inturned lips 84 are provided thereon. In Figure 11, the stamped retainer 78 of Figure 8 is shown with a cupped edge at its innermost diameter as at 85.

The lips or cup shapes of Figures 9 to 11, inclusive, are desirable since they afford a means of retaining the bearing annulus in position when the pin or shaft 68 is not in place.

The assemblies disclosed in Figures 5 to 11, inclusive, are particularly valuable since they enable the races to be easily and accurately ground in a minimum of time with the assurance of a better surface. This advantage is of prime importance where the assembly is of the needle-bearing type as the clearances there involved are critical.

Since it forms no part of the present invention, means for lubricating the assemblies of Figures 5 to 11, inclusive, has not been shown.

As previously pointed out, a major advantage of the present invention resides in the fact that the bearing races are not contracted by reason of any elements with which they are associated, but rather are maintained in undistorted relation and are prevented from contracting so that there can be no binding of the needles contained within the race. This is due to the inside press-fit of the retainer which permits expansion only and prevents contraction.

The maintenance of this clearance is of the greatest importance in a needle bearing and if the proper clearance is not maintained the bearing will fail. This failure is due to the fact that there is insufficient clearance on the unloaded side of the bearing to permit of what has come to be called "automatic race rectification", whereby the needles which become skewed on the loaded side of the trunnion are allowed sufficient clearance to resume their normal position and prepare for further contact with the load. A complete description of the method of operation of the bearing of the type described and the importance of maintaining the necessary clearances will be found in my patent hitherto referred to.

While the present invention has been described in connection with needle bearings of the needle type, it is to be understood that it is not so limited and may be embodied in assemblies employing other types of bearings.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A bearing assembly comprising a cup-shaped race; a plurality of independently movable cylindrical needles arranged with lubricant within said race to form a sliding and rolling bearing sleeve; and a needle retainer fitted snugly within the open end of said race, said race and needle retainer being arranged to maintain said needles in assembled relation to permit handling of said assembly as a unit.

2. A bearing assembly comprising a cup-shaped race; a plurality of independently movable cylindrical needles arranged within said race to form a bearing annulus; and a needle retainer fitted within the open end of said race, said race and needle retainer being formed with opposing annular grooves to engage said bearing annulus and maintain the needles in assembled relation to permit handling of said assembly as a unit.

3. A bearing assembly comprising a cup-shaped race; a plurality of independently movable cylindrical needles arranged with lubricant within said race to form a sliding and rolling bearing sleeve; a needle retainer fitted rigidly within the open end of said race; and means between the retainer and said race to determine the position of said needle retainer to obtain the desired clearance at the ends of said needles.

4. In a universal joint, means provided with an aperture; means provided with a trunnion extending into said aperture; a bearing mounted within said aperture and arranged to support said trunnion and comprising a race and a plurality of independently movable cylindrical needles arranged within said race in annular relation with respect to said trunnion; a shoulder on said trunnion; and a needle retainer positioned to be supported by said shoulder, said race being arranged to fit snugly over said needle retainer whereby said retainer maintains said race against distortion and contraction and prevents binding of said needles.

5. In a universal joint, means provided with an aperture; means provided with a trunnion extending into said aperture; a bearing mounted within said aperture and arranged to support said trunnion comprising a race and a plurality of independently movable cylindrical needles arranged within said race in annular relation with respect to said trunnion; a shoulder adjacent the base of said trunnion; a needle retainer positioned to be supported by said shoulder; and a shoulder on said needle retainer, said race being arranged to fit snugly over said needle retainer in engagement with the shoulder on said retainer so that said retainer maintains proper end clearance for said needles and resists distortion of said race.

6. In a universal joint, means provided with an aperture; means provided with a trunnion extending into said aperture; a bearing mounted within said aperture and arranged to support said trunnion comprising a plurality of independently movable cylindrical needles arranged in annular relation with respect to said trunnion; a shoulder on said trunnion; a lubricant seal on said shoulder; a needle retainer on said trunnion engaging said seal; a bearing race for said needles fitted snugly over said needle retainer; and means to maintain said race in predetermined position on said needle retainer whereby the proper clearance for said needles is maintained.

7. In a universal joint, means provided with an aperture, means provided with a trunnion extending into said aperture; a bearing within said aperture comprising an open-ended cup; a plurality of independently movable cylindrical needles arranged within said cup to form a bearing annulus; and a needle retainer fitted within the open end of said cup to maintain said cup against distortion and contraction, said needle retainer being grooved sufficiently to maintain said needles in position when removed from said trunnion, but insufficient to prevent contact between said trunnion and said needles when assembled with said trunnion.

8. In a universal joint, means provided with an aperture; means provided with a trunnion extending into said aperture; a bearing mounted within said aperture to support said trunnion comprising a plurality of independently movable cylindrical needles arranged in annular relation with respect to said trunnion; a shoulder on said trunnion; a lubricant seal on said shoulder; a needle retainer on said trunnion engaging said seal; and a bearing race for said needles fitted snugly over said needle retainer whereby said retainer maintains said race against distortion and contraction and prevents binding of said needles.

9. In a universal joint, means provided with an aperture; means provided with a trunnion extending into said aperture; a bearing mounted within said aperture to support said trunnion comprising a plurality of independently movable cylindrical needles arranged in annular relation with respect to said trunnion; a shoulder on said trunnion; a lubricant seal on said shoulder; a needle retainer on said trunnion engaging said seal; a bearing race for said needles fitted snugly over said needle retainer whereby said retainer maintains said race against distortion and contraction and prevents binding of said needles; and means on said seal to overlap said needle retainer in the direction toward the outer end of said trunnion whereby entry of foreign matter into said bearing is prevented by centrifugal force.

10. A universal joint trunnion bearing assembly comprising a bearing member having a cylindrical bore, a trunnion having an end portion terminating in said bore, a plurality of bearing needles interposed between said bore and said trunnion end portion, and a needle retainer within said bore adapted to resist distortion of said bore for maintaining radial clearance for said needles, and thereby permitting free sliding and rotating movement of said needles.

11. A universal joint trunnion bearing assembly comprising a bearing member having a cylindrical bore, a trunnion having a cylindrical end portion disposed in said bore, a plurality of bearing needles interposed between said bore and said trunnion end portion for maintaining the latter substantially concentric of said bore, a needle retainer pressed into said bore, and stop means for locating said retainer in said bore to provide clearance at the ends of said needles.

12. A universal joint trunnion bearing assembly comprising a bearing member having a bore, a trunnion disposed in said bore, a plurality of bearing needles interposed between said bore and said trunnion, a needle retainer pressed into said bore, means on said retainer for positioning said retainer in said bore to provide clearance for said needles, and a lubricant seal cooperating with said retainer to provide a seal between said bore and said trunnion.

13. A universal joint trunnion bearing assembly comprising a bearing member having a cylindrical bore, a trunnion having an end portion terminating in said bore, a plurality of bearing needles between said bore and said trunnion end portion, and a rigid needle retainer within said bore for strengthening said bearing member against distortion and positioning the needles in said bore so that predetermined radial and end clearances for said needles are maintained.

14. A universal joint trunnion bearing assembly comprising a bearing member having a cylindrical bore, a trunnion having an end portion in said bore, a plurality of cylindrical bearing needles between said bore and trunnion end portion, and a rigid annular needle retainer tightly fitted within said bore so as to re-enforce said bearing member against distortion during operation and thereby maintain proper radial clearance for said bearing needles.

15. In the universal joint assembly defined in claim 14, said needle retainer having a stop shoulder formation adapted to cooperate with a wall of said bore to define the axial position of said retainer within said bore and thereby establish a predetermined end clearance for said needles.

16. For use in a needle bearing universal joint trunnion bearing assembly, a rigid needle retainer ring having a surface formation at one end for cooperatively engaging the ends of the needles, an exterior cylindrical surface on said ring adjacent said formation, and substantially radially projecting stop shoulder means on said ring at one end of said cylindrical surface.

JOSEPH E. PADGETT.

DISCLAIMER 2,190,041.—*Joseph E. Padgett*, Toledo, Ohio. BEARING. Patent dated February 13, 1940. Disclaimer filed August 27, 1941, by the inventor.
Hereby enters this disclaimer to claims 1, 2, and 3 in said specification.
[*Official Gazette September 16, 1941.*]